US00RE38174E

(19) United States
(12) Reissued Patent
Look

(10) Patent Number: US RE38,174 E
(45) Date of Reissued Patent: Jul. 8, 2003

(54) METHOD AND SYSTEM FOR THERMAL GRAPHIC PRINTING

(75) Inventor: Thomas F. Look, Ham Lake, MN (US)

(73) Assignee: 3M Innovative Properties Company, St. Paul, MN (US)

(21) Appl. No.: 09/685,937

(22) Filed: Oct. 6, 2000

Related U.S. Patent Documents

Reissue of:
(64) Patent No.: 5,818,492
Issued: Oct. 6, 1998
Appl. No.: 08/241,756
Filed: May 12, 1994

(51) Int. Cl.[7] ..... B41J 2/325
(52) U.S. Cl. ..... 347/171; 347/172; 347/176
(58) Field of Search ..... 347/171, 172, 347/174, 176, 212; 400/120.01, 120.02, 120.04, 82, 118.3

(56) References Cited

U.S. PATENT DOCUMENTS

| | | | | |
|---|---|---|---|---|
| 3,632,969 A | * | 1/1972 | Walkow | 219/216 |
| 3,855,448 A | | 12/1974 | Hanagata et al. | |
| 4,380,874 A | * | 4/1983 | Waldron | 33/184.5 |
| 4,419,170 A | * | 12/1983 | Blad | 156/361 |
| 4,467,525 A | * | 8/1984 | Logan et al. | 346/139 |
| 4,475,825 A | | 10/1984 | Hashimoto | |
| 4,558,963 A | | 12/1985 | Applegate et al. | |
| 4,650,350 A | | 3/1987 | Dorner | |
| 4,668,963 A | * | 5/1987 | Tanabe et al. | 346/139 |
| 4,705,414 A | | 11/1987 | Guy et al. | |
| 4,723,853 A | * | 2/1988 | Suzaki et al. | 400/120 |
| 4,799,172 A | * | 1/1989 | Wood et al. | 364/158 |
| 4,844,632 A | | 7/1989 | Minowa | |
| 4,855,758 A | * | 8/1989 | Kuwabara et al. | 346/76 |
| 4,880,324 A | | 11/1989 | Sato et al. | |
| 4,897,668 A | * | 1/1990 | Nagato et al. | 346/76 |
| 5,053,788 A | | 10/1991 | Tohdo | |
| 5,064,272 A | * | 11/1991 | Bailey et al. | 359/541 |
| 5,064,301 A | * | 11/1991 | Nakamura et al. | 400/120 |
| 5,115,253 A | | 5/1992 | Yorozu et al. | |
| 5,144,331 A | | 9/1992 | Amano | |
| 5,267,802 A | * | 12/1993 | Parnell et al. | 400/208 |
| 5,328,771 A | * | 7/1994 | Mizobuchi | 428/483 |
| 5,383,733 A | * | 1/1995 | Zinsmeyer et al. | 400/208 |
| 5,405,205 A | * | 4/1995 | Venthem et al. | 400/634 |
| 5,499,879 A | | 3/1996 | Meetze | |
| 5,610,649 A | | 3/1997 | Kokubo | |
| 5,628,572 A | | 5/1997 | Sato et al. | |

FOREIGN PATENT DOCUMENTS

| | | | | |
|---|---|---|---|---|
| EP | 0329478 A2 | * | 8/1989 | B41J/3/20 |
| EP | 0485364 A1 | * | 5/1992 | |
| JP | S63-205251 | * | 8/1988 | |
| JP | 1-242268 | * | 9/1989 | |
| JP | 3-224750 | | 10/1991 | |

OTHER PUBLICATIONS

Patent Abstracts of Japan, vol. 12, No. 485 (M–777) [3332], Dec. 19, 1988 & JP.A.63 205251 (Konika Corp.) Aug. 24, 1988, see abstract.*

"Reprography," *Encyclopedia of Chemical Technology*, 3rd ed., vol. 20 pp. 128–179 (1982).

Markem Corporation product literature for LP8400 thermal transfer apparatus (May 1992).

* cited by examiner

*Primary Examiner*—Huan Tran
(74) *Attorney, Agent, or Firm*—James D. Christoff

(57) ABSTRACT

A method of thermally transferring colorant from a movable ribbon onto printable areas of a thermal print receptive sheeting. The method includes arranging a print head so that its length is substantially parallel to the direction of travel of the thermal print receptive sheeting and transferring colorant from the movable ribbon to the sheeting as the sheeting is stationary and the thermal print head is moved in a second direction substantially normal to the length of the thermal print head. The system includes a thermal print head, a transport for moving the thermal print receptive sheeting past the thermal print head in the first direction, and a mechanism that moves the print head in a second direction normal to the first direction when the print head is transferring colorant onto the sheeting.

41 Claims, 4 Drawing Sheets

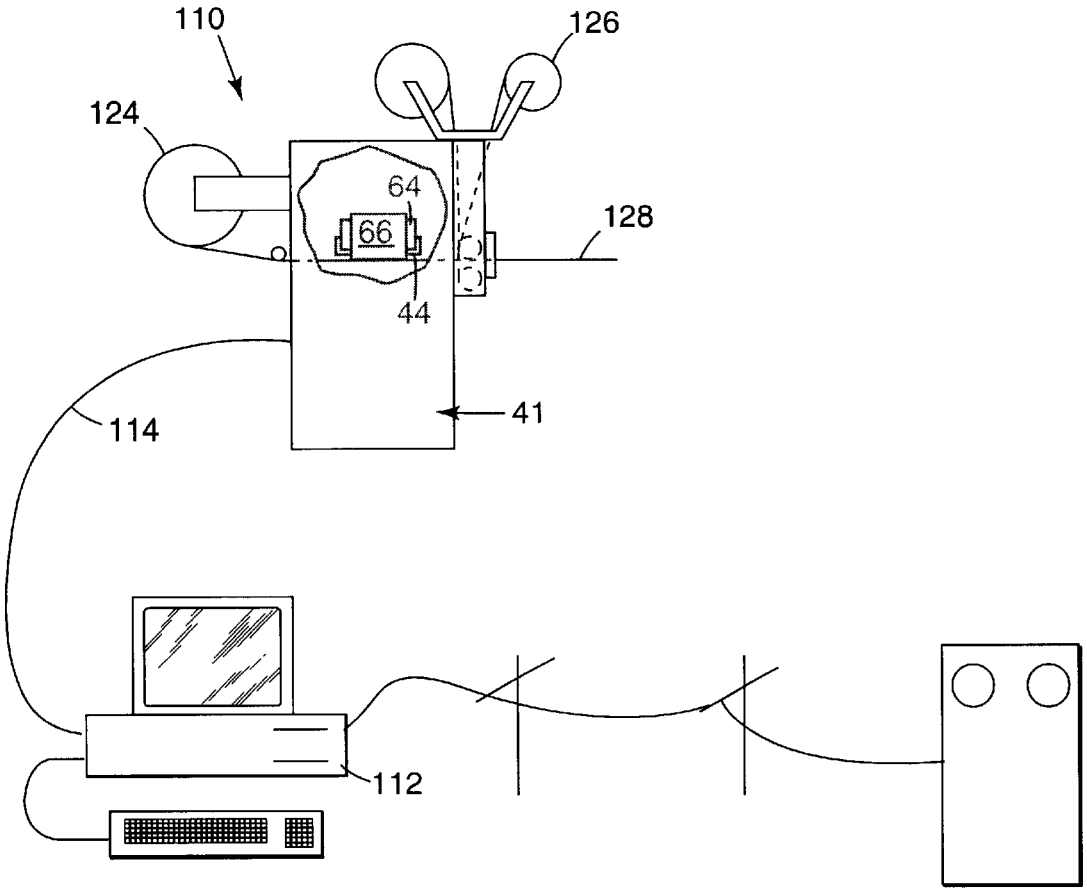
*Fig. 6*
Amended

METHOD AND SYSTEM FOR THERMAL GRAPHIC PRINTING

Matter enclosed in heavy brackets [ ] appears in the original patent but forms no part of this reissue specification; matter printed in italics indicates the additions made by reissue.

TECHNICAL FIELD

This invention pertains to a method and system for applying a thermally-printed indicia to a sheeting in a direction normal to the direction of movement of the sheeting past a print head.

BACKGROUND OF THE INVENTION

Signs are commonly used along roadways to display information to motor vehicle drivers. A highway sign typically includes a retroreflective sheeting that has characters placed thereon. The characters form information that is of interest to [the] motor vehicle drivers, and the retroreflective sheeting allows the information to be vividly displayed by the sign at nighttime. A retroreflective sheeting has the ability to return a substantial portion of incident light in the direction from which the light originated. Light from motor vehicle headlamps is retroreflected by the signs, allowing the information to be read more easily by passing motorists.

Highway signs tend to be fairly large in size to accommodate large characters. The characters are applied to the signs, typically, by screen printing or by use of cut-out characters. In screen printing, a positive or negative image of the characters is first provided on the screen. This often is accomplished by exposing non-masked portions of a photosensitive screen to light and removing the un-sensitized, masked regions by scrubbing. Ink is then forced onto the retroreflective sheeting through the openings in the screen where the photosensitive material was removed. Screen printing is the method of choice for making the more common signs such as stop and yield signs.

When a custom sign is needed, the cut-out character method frequently is used. Cut-out characters are made by die cutting each character or by electronically cutting the characters from a stock material such as Scotchlite™ electronic cuttable film. The cut-out characters typically are secured to the underlying retroreflective sheeting by use of an adhesive or rivets. Although the screen printing and cut-out character methods provide suitable ways of placing characters on highway signs, these methods tend to be time-consuming and somewhat cumbersome.

Thermal printing has become a popular and commercially successful technique for forming characters on a substrate. Also referred to as thermal transfer printing, non-impact printing, thermal graphic printing, and thermography, thermal printing is a process by which a colorant is transferred with the aid of heat from a carrier to a thermal print receptive substrate. Thermal printing is more rapid than screen printing or cut-out characters, and it is less cumbersome and relatively simple to carry out in practice.

While thermal printing provides a rapid, wieldy means for placing information on a sheeting, this printing method also has its drawbacks. A major drawback is that known thermal printing apparatuses [and] *are* unable to handle large sheetings. The presently known apparatuses generally are unable to print on sheetings greater than 16 cm wide. If a sign larger than 16 cm wide is desired, separate sheets must be printed on and those sheets must be subsequently joined together to produce the whole sign. Thermal printing has been used to place information on a retroreflective sheeting, however, the information that has been printed has been limited in size to images such as bar codes; see, for example, U.S. Pat. No. 5,118,930 to Takada.

FIGS. 1 and 2 illustrate an example of a known thermal printing apparatus 10 having a print head arrangement 11 that comprises driven roller 14 and a thermal print head 16. A thermal print receptive sheeting 12 is shown disposed therebetween. Thermal print head 16 may comprise heatable resistive elements in a thermal heating system.

If roll sheeting stock is used as depicted in FIG. 2, sheeting 12 is held upon a sheeting supply reel 26 and is collected at a sheeting take-up reel 28. Dancer rollers 25 along with supply reel 26 comprise suitable tensioning means for sheeting 12. Ribbon 24 is held upon and tensioned by reel 22 and is collected on driven reel 23. Sheeting 12 is transported in the direction generally indicated by arrow y across roller 14 by sheeting transport means known in the art, for example, a friction drive mechanism using a stepper motor. Print head 16 remains stationary and makes contact with thermographic ribbon 24 and transfers colorant from ribbon 24 to sheeting 12 as the sheeting 12 moves past the print head 16. When transfer of colorant is completed or is not to be applied, print head 16 may be retractably disengaged from ribbon 24 in the direction generally indicated by arrow z. Currently available thermal print arrangements may be referred to as "down web" systems, because indicia are applied down the length of the sheeting while the sheeting is in motion. The thermal print head 16 is rectangular in shape and typically has a dimension S of about 10 to 16 centimeters, but thermal print heads having a dimension S of up to about 46 centimeters also are known. Ribbon 24 has the same width S, shown in FIG. 1, as print head 16. Dimension S determines the maximum printing width of sheeting 12 that can be printed upon with print head arrangement 11 in a single pass.

Because dimension S is limited in size, thermal printing has not found great commercial success in providing images on large sheetings such as on retroreflective sheetings used in highway signs. When a sign larger than S is desired, separate sheets must be printed on and those sheets must be joined together in registration to produce the whole sign. Another disadvantage of known thermal printing systems is that the wide ribbon has a tendency to wrinkle, causing an uneven transfer of colorant and poor quality indicia. Further, known systems do not use the ribbon in a very efficient manner. Thermal printing in a region having a width less than S results in using only the portion of the ribbon corresponding to the width of the printed image. The unused portion of the ribbon becomes discarded with the used portion and therefor results in unnecessary waste.

SUMMARY OF THE INVENTION

The present invention provides a method and systems which overcome the aforementioned drawbacks. Briefly, the method of the invention comprises thermally transferring colorant from a movable ribbon onto the printable areas of a thermal print receptive sheeting by the steps of:

a) moving a thermal print receptive sheeting past a thermal print head, where the thermal print head is elongate and has a length L of at least one centimeter that extends substantially in a first direction; and b) transferring the colorant from the movable ribbon to the thermal print receptive sheeting while the thermal print head is moved in a second direction substantially normal to the first direction.

In one aspect, the system of the invention comprises: a) an elongate thermal print head for transferring colorant, having a length L of at least one centimeter arranged substantially in a first, "down web", direction that is parallel to the direction of travel of the thermal print receptive sheeting; b) a transport for moving the thermal print receptive sheeting past the thermal print head in the first direction and operably positioning the sheeting to receive colorant; c) a mechanism that moves the print head in a second, "cross web", direction substantially normal to the first direction when the print head is transferring colorant; and d) at least one control device for coordinating print head engagement, colorant transfer, sheeting transport, and print head linear motion. The system may further comprise a mechanism for disengaging the thermal print head when the thermal print head is moved in the second direction and when no colorant is being applied to a printable area of the sheeting.

In another aspect, the system of the invention comprises a modular and transportable thermal printing system for transferring colorant from a ribbon to the printable area of a thermal print receptive sheeting. The modular and transportable thermal printing system has a frame assembly, a plurality of reel assemblies, a thermal printing mechanism, a print head moving mechanism, and at [lest] *least* one control device. The frame assembly includes horizontal rail members and vertical rail members assembled in an open frame structure. The frame members have walls defining apertures suitable for receiving, in modular fashion, system components as needed. The reel assemblies operably hold, position, and rewind the thermal print receptive sheeting. Each of the reel assemblies has a mechanism for mounting onto the frame assembly. The reel assemblies transport the sheeting in a first direction. The thermal printing mechanism comprises an elongate, disengageable thermal print head having a length L of at least one centimeter arranged substantially parallel to the first direction for transferring colorant. The print head moving mechanism moves the print head in a second direction substantially normal to the first direction when the print head is transferring colorant. The system control mechanism operably controls print head actuation, print head retraction, colorant transfer, sheeting transport, and print head linear motion.

The method and systems of the invention are advantageous in that sheetings having a width greater than S (FIG. 1) now can receive a thermally printed indicia. The thermal printing method and systems of the invention also overcome the problem of ribbon wrinkling because they are able to use a ribbon having a narrow width. This is accomplished by having the sheeting stationary while the ribbon moves over the sheeting as the indicia is being printed thereon. Further, the method and systems of the invention provide more efficient use of ribbon and place less stress on the ribbon when in use. Also, a single ribbon can be used to print on sheetings of [vary] *varying* widths. No longer does the ribbon need to be changed to accommodate varying sheeting widths.

The above and other advantages of the invention are more fully shown and described in the drawings and detailed description of this invention, where like reference numerals are used to represent similar parts. It is to be understood, however, that the drawings and description are for the purposes of illustration only and should not be read in a manner that would unduly limit the scope of this invention.

BRIEF DESCRIPTION OF THE DRAWINGS

FIG. 6 is a schematic view of a thermal printing system 110 in accordance with the present invention.

DETAILED DESCRIPTION OF PREFERRED EMBODIMENTS OF THE INVENTION

In this invention, "thermal printing" refers to those processes that transfer colorant from a ribbon to a substrate by use of localized heat. Typically, thermal printing is accomplished by a non-impact system that transfers colorant by the simultaneous application of localized heat and pressure. A system that transfers colorant predominantly by impact would not be considered to generate a significant amount of localized heat during the impact to qualify as a thermal printing system. The term "colorant" is used herein to mean a media capable of providing an image or indicia on the surface of a thermal print receptive sheeting. The colorant may be a binder media that contains a pigment(s), a dye(s), or a combination thereof. The colorant is transferred to a thermal print receptive sheeting by a thermal print head that contains, for example, resistive elements, ribbon-contacting elements in a laser system, electronic elements, thermally activated valve elements, inductive elements, thermopile elements, and the like. The term "thermal print head" refers to the mechanism or mechanisms that provide the localized heat for the transfer of colorant. A preferred mechanism for transferring colorant comprises heatable resistive elements in a thermal print head of a thermal mass transfer printing system. Using the method and systems of the invention, indicia may be formed which includes alphanumeric characters, logos, or graphic information upon the thermal print receptive substrate.

Figure 3:
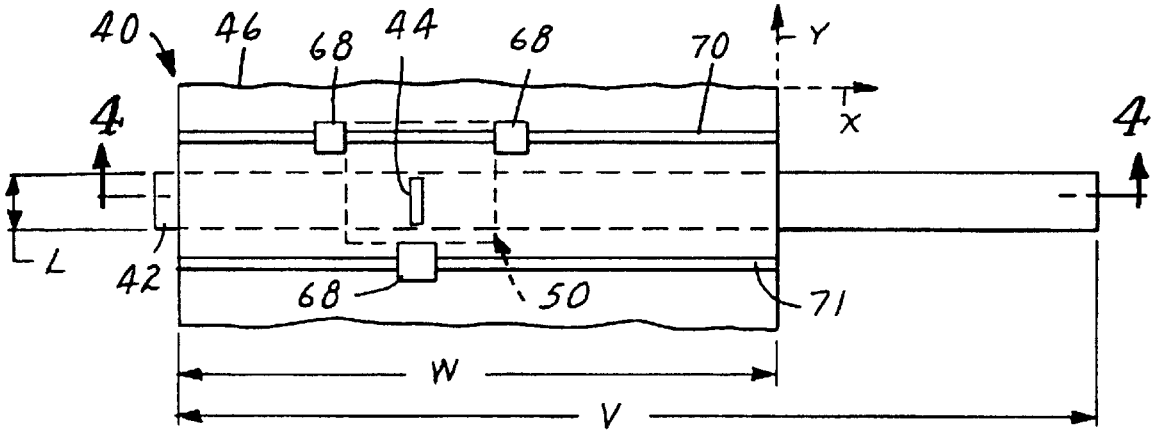
FIG. 3 is a top schematic view of a print head arrangement 40 in a thermal printing system in accordance with the present invention.

FIG. 3 schematically illustrates a thermal print head arrangement 40 of the invention. Print head arrangement 40 is shown to comprise a platen 42 and an elongate thermal print head 44. A thermal print receptive sheeting 46 is shown disposed therebetween. Sheeting 46 may take the form of, for example, a continuous roll of sheeting or a number of individual sheets each fed individually past print head 44. Print head 44 may comprise ribbon-engaging elements which place the ribbon in contact with the thermal print receptive sheeting by applying a slight degree of pressure thereon. Heatable resistive elements or any other suitable means for providing localized heat may then operate to transfer the colorant to the sheeting. Elongate print head 44 preferably includes a row of discrete heating elements that operably transfer colorant from a ribbon to a thermal print receptive sheeting by heating means known in the art. The length of the heating element row defines a dimension L, which is substantially parallel to a first direction generally indicated by arrow y in FIG. 3. L is the maximum length of sheeting 46 that can be printed upon by print head arrangement 40 in one print operation cycle, described more particularly below. Length L of print head 44 may be any reasonable dimension, but generally is from about 1 to 38 centimeters, preferably about 4 to 27 centimeters, more preferably about 10 or about 16 centimeters. Print head 44 may be the same print head 32 used in known print head arrangement 11 (FIG. 1), in which case, dimensions S and L of FIGS. 1 and 3, respectively, may be equal.

Thermal print head 44 operates to transfer discrete areas of colorant to a thermal print receptive sheeting 46. The size of the colorant transfer area, or dot, can be determined by the area of each discrete heating element in print head 44, as is known in the art. Such dots are generally about $3.76\times10^{-6}$ square centimeters, which is the area of a pixel. The resolution of indicia printed with print head 44 generally is from about 75 to about 250 dots per lineal centimeter.

Figure 4:
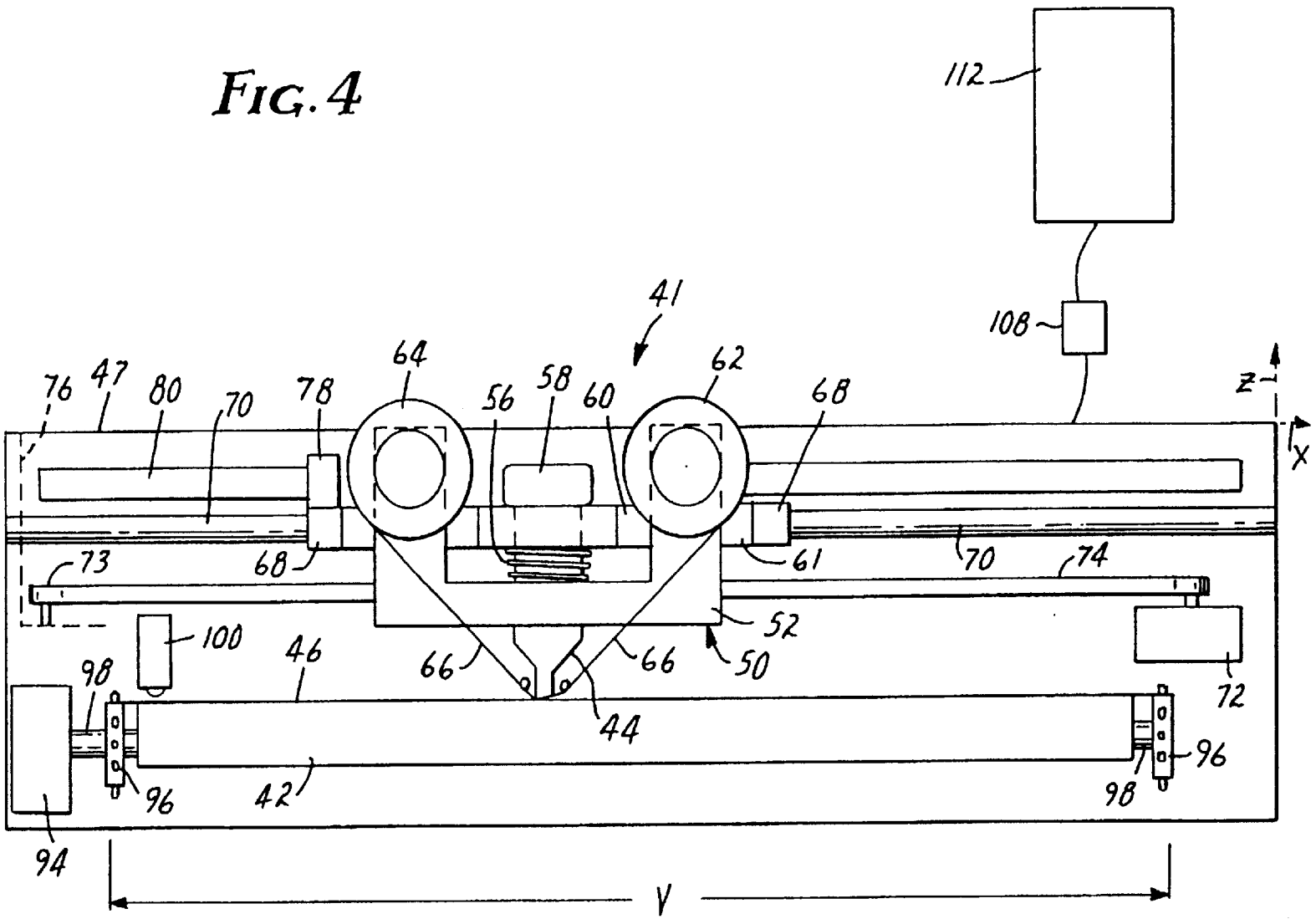
FIG. 4 is an end schematic view taken along line 4—4 of FIG. 3 of one embodiment of a printer 41 having a print head arrangement in accordance with the present invention.

FIG. 4 illustrates an embodiment of a cross web thermal printer 41 having a thermal print head assembly 50. In this embodiment, print head assembly 50 comprises print head frame 52 supporting print head 44, head actuator solenoid 58 projecting through head tensioning spring 56 and bushing 60 and mounted on alignment bearing carriage 61. Print head assembly 50 also has a ribbon travel mechanism, comprising back tensioning supply reel 62 dispensing ribbon 66 under print head 44 onto powered ribbon take-up reel 64. Ribbon 66 travels from supply reel 62 to take-up reel 64 when print head 44 is operably transferring colorant and is moving across sheeting 46. Print head 44 may be retractably disengaged from contact with ribbon 66 while moving across sheeting 46, as described more particularly below.

An example of a print head that can be incorporated into print head assembly 50 of FIG. 4 is the print head incorporated into an apparatus sold under the trade name Model T1006, manufactured by Printonix of Irvine, Calif. This apparatus combines a frame, print head, ribbon transport mechanism, a mechanism for data communication, a mechanism for heating head elements and the like, in one modular, readily obtainable item. The print head in the Model T1006 apparatus has a dimension L of about 16 centimeters. Other, similar apparatuses that incorporate a print head suitable for the invention are the apparatus sold under the trade name Tec B472, by Tech Corporation, Los Angeles, Calif. having a print head dimension L of about 10 centimeters, and the apparatus sold under the trade name Zebra 140, by Zebra Technologies Corporation, Vernon Hills, Ill., having a print head length L of about 13 centimeters.

Ribbon 66 may have a wax-based, resin-based or a combined wax/resin-based binder, although a preferred ribbon comprises a resin-based binder. The width of ribbon 66 may be substantially the same as or narrower than length L of print head 44. Ribbon 66 may be, for example, a ribbon sold under the trade name Printronix 2150 or 2200, or ribbon sold under the trade name Zebra No. 5030/5099 by Zebra Technologies Corporation of Vernon Hills, Ill. Alternatively, ribbons may be used which are sold under the trade names Sony brand No. 3021/3022/3023 by Sony Chemical Corporation of America, Wood Dale, Ill.

In the embodiment shown in FIG. 4, a print head assembly alignment mechanism comprises a plurality of linear motion bearings 68, two of which are shown in FIG. 4. Linear motion bearings 68 are secured to alignment bearing carriage 61 and slidably mounted upon fixed shaft 70 and fixed shaft 71 (FIG. 3). Print head assembly stop 76 is positioned stationary on shaft 70 or shaft 71.

A print head linear motion mechanism moves a print head in a second direction (indicated by arrow x in FIGS. 3 and 4) that is substantially normal to the first direction (indicated by arrow y in FIG. 3). As shown in the embodiment of FIG. 4, a print head linear motion mechanism may comprise a continuous drive belt 74, that engages a drive wheel of a print head motor 72, and that is responsive to actuation of the print head motor 72. Tension may be maintained on drive belt 74 by an idler wheel 73. A print head assembly 50 may be secured to a drive belt 74 and may be linearly movable along a fixed shaft 70 and a fixed shaft 71 in response to movement of a drive belt 74 by a motor 72.

A print head motor may be, for example, a motor made by Airpax Corp., Cheshire, Conn. and sold under the trade name Airpax 82900. Other suitable motors for actuating print head linear motion are, for example, a stepper motor, a DC brushless motor with an encoder, or an AC synchronous motor with encoder. Print head linear motion mechanisms that comprise one of these motors are known in the art.

A linear motor system, which combines a track mechanism, drive mechanism and positioning mechanism, may conveniently provide both linear motion mechanisms as well as position tracking devices, described below. Alternatively, a lead screw drive assembly actuator apparatus comprises linear motion mechanisms and print head alignment mechanisms in one readily obtainable item.

A print head sensor 78 may be mounted on print head assembly 50 by attachment to print head frame 52 that slidably engages a fixed, etched glass bar 80. Print head sensor 78 may be, for example, an optical sensor or a magnetic sensor, and is operably connected by a data line (not shown) to a mechanism such as computer 112 for comparing the position of print head 44 relative to the position of sheeting 46. Alternatively, print head sensor 78 may be a linear scale system made by Sony Corporation, which system comprises a bar and suitable sensor. Other print head position tracking devices known in the art also may be used.

A transport advances or transports thermal print receptive sheeting past a print head in a first direction, (indicated by arrow y in FIG. 3). In the embodiment depicted in FIG. 4, the transport is shown to comprise a platen 42 having a shaft 98 projecting at each end therefrom. Shaft 98 extends at one end through sheeting positioning mechanisms 96 to axially rotatably engage platen stepper motor 94. Sheeting positioning mechanism 96 is rotatably coupled to shaft 98 and may be, for example, an adjustable pin feed wheels of tractor drive mechanisms. Thermal print receptive sheeting 46 rests upon platen 42 and engages sheeting positioning mechanism 96 through drive holes in sheeting 46. Platen 42 provides a platform against which print head 44 can maintain a uniform contact pressure as print head 44 and ribbon 66 travel across sheeting 46. Platen 42 generally is made of a material having medium hardness and moderate resilience. The material selected to form platen 42 depends to some extent upon the flexibility and resilience of sheeting 46, in order to allow suitable uniform movement of ribbon 66 under head 44.

A preferred sheeting transport can comprises a tractor drive mechanism sold under the trade name Model ST-611, by Seitztec, Torrington, Conn. A friction drive assembly, however, may be substituted for a tractor drive mechanism if less graphic accuracy in the formed indicia is acceptable. A friction drive assembly has a lower cost and eliminates the need for drive holes in sheeting 46. It is possible in this invention, although typically less preferable, to use a manual transport of the sheeting.

An optional sheeting sensor may be employed to receive positional information regarding sheeting 46. In the embodiment shown in FIG. 4, a sensor 100 is located near a graphic edge of sheeting 46. Sheeting sensor 100 may comprise a light actuated sensor providing accurate positional information suitable for identifying the down web position of sheeting 46 in the y direction. Other types of sensors are also suitable, such as a tactile sensor or a gap hole sensor. A sheeting sensor is useful, for example, when sheeting 46 comprises a roll of stickers, and it is necessary to repetitively position stickers on platen 42. When sheeting 46 comprises single sheets, a sheeting sensor may be used to accurately align the sheeting on platen 42. Registration marks also may be on sheeting [42] *46* to allow four color printing to be achieved. In some embodiments, for example, when a stepper motor comprises a print head linear motion mechanism, a sheeting sensor may not be necessary.

Referring to FIGS. 3 and 4, one embodiment of a cycle of print operation is initiated with thermal print head assembly 50 sealed against print head assembly stop 76 at a location generally indicated by 47. Sheeting 46 is transported in a first direction, generally indicated by arrow y, across platen 42 by a sheeting transport. At a desired sheeting position, for example, at the beginning of a graphic edge, sheeting advance momentarily ceases. Print head 44 is actuated to contact ribbon 66 and is actuated to transfer colorant from ribbon 66 to sheeting 46, while print head 44 is propelled by a linear motion mechanism in a second direction generally indicated by arrow x. Print head 44 is properly aligned in relation to platen 42 and sheeting 46 by a print head alignment mechanism. After completing transfer of colorant, print head 44 is disengaged, either retractably and/or rotationally (or by any other suitable means), by, for example, an actuator solenoid 58 and is returned to position 47 by a linear motion mechanism. Sheeting 12 then resumes its advance. A mechanism for operably controlling print head arrangement 40 and print operation cycles may include, for example, a personal computer 112 and a print head computer apparatus 108. Using a personal computer 112 and a print head computer apparatus 108, graphics-based indicia may be printed, as opposed to the less versatile single-character-based indicia. In reference to the present invention, graphics-based indicia are images that are produced by electronically formatting the image so that more than one character can be produced per electronic transmission. A graphics-based print head also may produce other images beyond the 128 or 256 printable characters.

The number of print operation cycles necessary to complete colorant transfer to a thermal print receptive article depends upon the dimensions of the desired indicia relative to length L of a print head 44. When more than one print operation cycle is necessary to complete indicia formation, print head sensor 78 may be used to locate the position of print head assembly 50 relative to the position of sheeting 46, preferably with an accuracy of less than one colorant dot. Print operation cycles may be repeated as described above, until the desired indicia have been formed on sheeting 46. If one pass is sufficient to complete the formation of indicia on an article, a print head sensor 78 and an etched glass bar 80 may not be needed. A print head sensor generally is useful when producing articles demanding a high degree of graphic accuracy. For the production of articles requiring less graphic accuracy, or when using a stepper motor or other mechanisms discussed above, a print head sensor may not be necessary.

In the embodiment described above, sheeting transport during a print operation cycle occurs after movement of print head 44 to location 47. However, any particular timing of sheeting advancement in relation to a print operation cycle is within the scope of the invention.

Print head arrangement 40 may be positioned in a printing system such that the direction indicated by arrow x of FIGS. 3 and 4 lies generally in a horizontal plane and the direction indicated by arrow z lies generally in a vertical plane. However, to facilitate modular assembly of components, easy maintenance, and suitable relationships with sheeting dispensing and rewind components, print head arrangement 40 may be constructed such that direction x lies in a vertical plane, a horizontal plane, or any other suitable plane.

Figure 5:
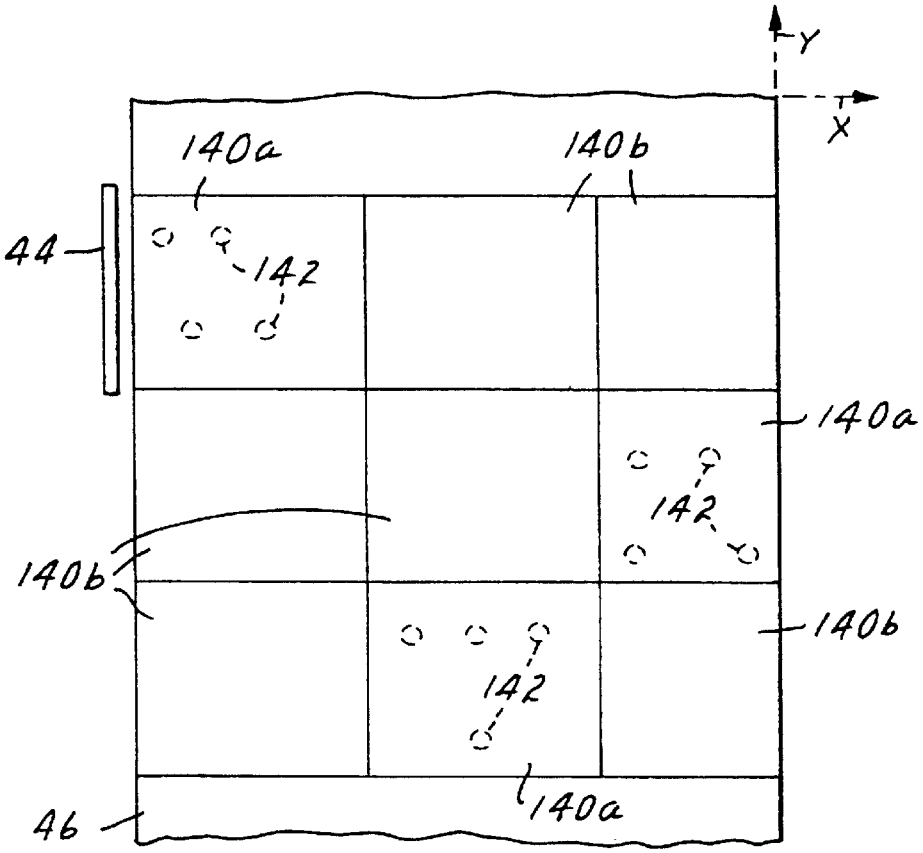
FIG. 5 is a top schematic view of a thermal print receptive sheeting 46 illustrating printed areas 140a printed in accordance with the present invention.

Thermal printing arrangements disclosed in this invention may be referred to as "cross web" systems, because colorant is applied across the width of the sheeting or web, in a direction generally normal to the length or direction of movement of the sheeting. As shown in FIG. 5, a sheeting 46 may be divided into "printable areas" 140a and 140b. Certain printable areas 140a may be destined to have indicia 142 printed upon them, whereas other printable areas 140b may not be destined to have indicia printed upon them (so-called white space). When the print head encounters an area 140b of sufficient size that is not intended to be printed upon, the print head may be disengaged by an actuator solenoid 58 (FIG. 4). The print head, however, may continue to move across sheeting 46 in the direction generally indicated by arrow x when additional indicia is desired to be printed. When the print head is disengaged under these circumstances, ribbon advance will cease, thus preventing unnecessary ribbon usage. As shown in FIG. 5, a three-fold savings of ribbon usage results over known systems due to ribbon movement only occurring in relation to three of the nine printable areas.

In another embodiment of the invention, indicia of more than one color can be applied to sheeting by adding additional printer heads, arranged in the same manner as described above, each head associated with a ribbon of a different color, i.e., red, green, blue, black and the like. As the sheeting is advanced past successive printer heads, colorant is applied from each successive ribbon. The print heads may be supported on the same assembly or each print head supported by a separate assembly. An apparatus having more than one print head is manufactured by Ring Corporation of Arlington Heights, Ill. It also is possible to apply more than one color with a single print head, by executing more than one printing operation and substituting a differently colored ribbon after each printing. In addition, ribbons having up to 4 strips of different colors are known, for example, red, green, yellow and black, and may be usefully employed in the print head arrangement and printing system disclosed herein to generate multi-color signage articles. The invention provides substantial ribbon savings in either a multi-color printing or multi-color process printing use, the latter normally using black, magenta, cyan, and yellow as transparent color overlays.

FIG. 6 illustrates an example of a preferred thermal printing system of the invention. Printing system 110 comprises a system control device, such as a personal computer 112, connected by a data line mechanism 114 to a thermal printer 41. Thermal printer 41 may comprise [reel mechanisms 62, 64] *reel mechanism 62* (*not shown in FIG. 6*) *and reel mechanism 64* for holding, dispensing, and rewinding a ribbon 66. A thermal print receptive sheeting 124, is passed through thermal cross web printer 41 and receives printed indicia that are formed when colorant is transferred by a print head 44 from thermal transfer ribbon 66. If desired, sheeting 124 may be attached or applied to a second substrate, such as a polymeric film layer 126, in order to produce a printed article 128. In such embodiments, layer 126 may be, for example, a top layer providing a protective coating and/or completing an optical relationship desired in the finished article. Sheeting 124 and layer 126 may be attached or applied by means such as laminating, dip coating, or other well known methods in the art. Layer 126 may be constructed from one, or more than one, sheeting. In alternative embodiments, layer 126 comprises the print receptive sheeting media, and sheeting 124 may be a base sheet which is combined with layer 126 after indicia are formed on layer 126.

An operator loads indicia to be printed and various print and sheeting control commands into computer 112 for use with print head data processing mechanisms within cross web thermal printer 41. The operator input is assembled by software into code suitable for controlling actuation, disengagement and colorant transfer by print head 44, transport by sheeting transport mechanisms in a second direction and movement of print head 44 by linear motion mechanisms in a direction perpendicular to sheeting transport movement. Data from optical sensors 78 and 100 (shown in FIG. 4) may be used by computer 112 in order to more conveniently and automatically control the printing process.

FIG. 6 shows a structure representative of systems compatible with the new print head arrangements of the invention. Specific configurations of thermal printing system 110 may be designed for transportability, interchangeability of components, reversibility of components, and/or ease of modular expansion for producing different articles. For example, an interchangeable modular component may comprise a print head, linear motion mechanism and head alignment mechanism, which can be readily exchanged in order to accommodate production runs for different articles. Embodiments of modular and transportable systems into which a print head arrangement described herein may be incorporated are disclosed in U.S. patent applications Ser. Nos. 08/017,573, 08/033,625, and 08/186,752, filed Feb. 16, 1993, Mar. 16, 1993 and Feb. 2, 1994, respectively, and incorporated herein by reference.

Thermal printing systems of the invention may be used to produce signage articles in dispersed locations, rather than in large central facilities. Methods and systems of the invention may be used to form repeating (or incrementally changing) information or variable information such as alphanumeric characters, graphic images or bar codes. For example, such articles may be made from retroreflective polymeric sheeting materials that are directly printable upon the upper surface thereof, as disclosed in U.S. patent applications Ser. No. 08/033,627, filed Mar. 16, 1993 and U.S. patent application Ser. No. 08/186,751, filed Feb. 2, 1994, the disclosures of which are, respectively, incorporated here by reference.

A thermal printing system can be configured to produce [of] signage articles such as highway signs. When an article such as a highway sign is desired to be formed, the sheeting onto which the thermally printed indicia is transferred may be a retroreflective sheeting or a polymeric layer that becomes secured to the front surface of the retroreflective sheeting. For purposes of this invention, it will be assumed that the indicia is transferred to or printed upon a retroreflective sheeting in those instances when there is a polymeric layer or layers disposed thereon. The retroreflective sheeting can be essentially any now known or later developed retroreflective sheeting. The retroreflective sheeting can be, for example, a cube comer element sheeting (see, for example, U.S. Pat. Nos. 3,684,348, 4,801,193, 4,895,428 and 4,938, 563, the disclosures of which are incorporated herein by reference), or a beaded lens sheeting comprising exposed lens elements, encapsulated lenses, or enclosed lenses (see, for example, U.S. Pat. Nos. 2,407,680, 3,190,178, 4,025, 159, 4,896,943, 5,064,272 and 5,066,098, the disclosures of which are incorporated herein by reference).

Figure 1:
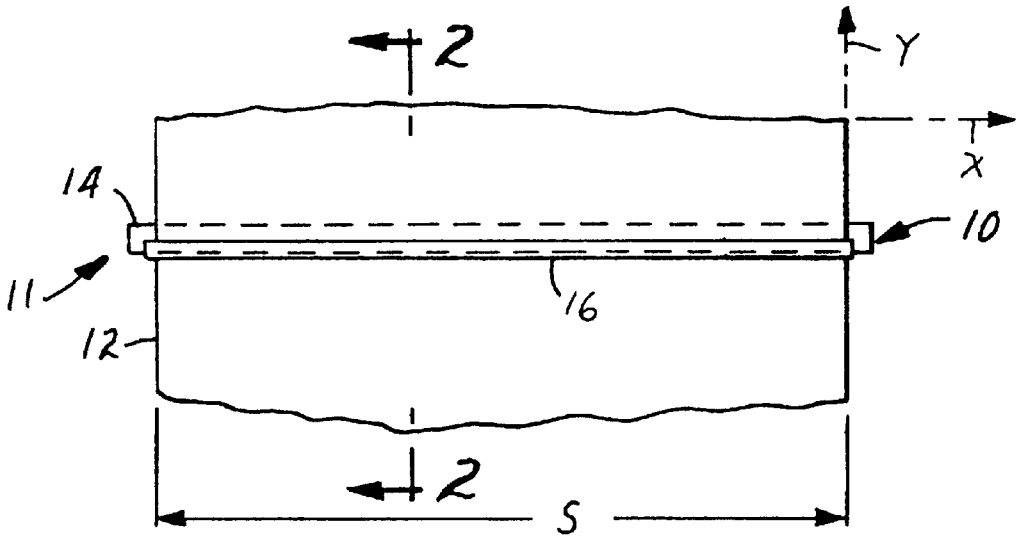
FIG. 1 PRIOR ART
FIG. 1 is a top schematic view of a print head arrangement 11 in a known thermal printing system.
Figure 2:
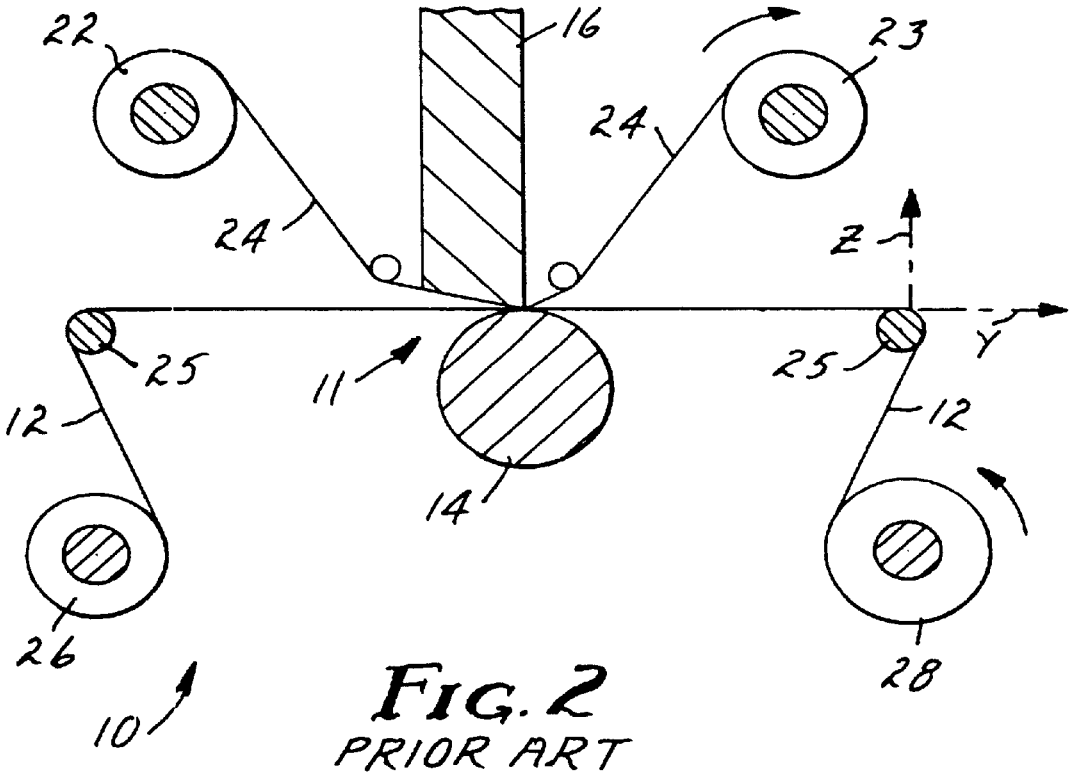
FIG. 2 PRIOR ART
FIG. 2 is a side schematic view taken along line 2—2 of FIG. 1, depicting the print head arrangement 11 in a known thermal printing system 10.

A thermal printing system of the present invention allows thermal printing on polymeric sheetings of varying widths, in particular, sheetings that are wider than 16 centimeters, wider than 38 centimeters, and even wider than 46 centimeters (FIG. 3). The thermal printing of the invention also may allow printing at various angles by moving the print head at the desired angle across the sheeting. A sheeting of width W (FIG. 3) may be conveniently replaced with sheeting having width V (FIG. 3). Width V may be either wider than or narrower than width, W; that is a sheeting of any reasonable width (for example, greater than 50 cm to as low as 2 cm) may be conveniently inserted into a printing system 110 comprising print head arrangement 40. In contrast, previously known thermal print head arrangements, diagrammed in FIGS. 1 and 2, are generally restricted to sheetings of width S or less. The term "width" is used herein to mean the dimension of the sheeting normal to the direction of sheeting travel; that is, parallel to the movement of the thermal print head.

Further advantages of the invention relate to ribbons used in thermal printing. Ribbon for thermal transfer printing are generally made with a 6 micrometer polyester backing and are generally 5 to 38 centimeters wide. Torsional and other stresses often cause the wider ribbons to flex, leading to ribbon wrinkling. Such wrinkling results in uneven transfer of colorant and poor quality indicia. The thermal printing system of the invention can overcome the problem of ribbon wrinkling by using a narrow width ribbon in a manner that provides full range ribbon capabilities normally attributed to wider ribbons, rather than trying to solve the wrinkling problem by redesigning the mechanical carriages. This preferred solution also results in more efficient ribbon use, as discussed in reference to FIG. 5.

A further advantage of the system disclosed herein is that only a single width of ribbon suffices for printing on varying widths of sheeting. Prior thermal printing systems required ribbon width to be essentially equal to print head [width] *length*, necessitating that different ribbons be installed on each printing system of a particular [width] *length*. In accordance with the present invention, a 60 centimeter wide sheeting and a 122 centimeter wide sheeting may be printed with the same ribbon, whereas such printing can not be accomplished with known systems because 60 or 122 centimeter wide ribbons are not available for down web thermal printing systems.

The system disclosed herein has yet another advantage, in that there is less waste of ribbon. Currently known thermal print head arrangements have a ribbon that is essentially the same width S (FIG. 1) as the print head width. Thermal printing on a sheeting of a width less than S with such a printing system results in only that portion of the ribbon corresponding to the sheeting width being used. The print head arrangement disclosed herein uses ribbon in proportion to the width of the sheeting being printed.

The disclosed thermal printing systems may provide reduced cost compared to prior thermal printing systems, especially for printing on wide sheetings. In thermal printing systems, the ribbon support members, print head assemblies, support frames and the like must be sufficiently rigid to minimize torsional and other stresses on the ribbon as it travels between the print head and the media substrate. The rigidity required for a 38 centimeter wide print head can be more than four times greater than that required for a 15 centimeter wide print head. As a consequence, the cost of a 38 centimeter wide print head system generally may be significantly greater than the cost of a 15 centimeter wide print head system. Cross web thermal printing systems disclosed herein can utilize less rigid and narrower print heads to print signage articles as wide or wider than a 38 centimeter down web system, thereby reducing the overall cost of the system.

A further advantage relates to the system control mechanism for a printing system of this invention. The formatting memory in the print head computer mechanism required to control a single wide print head may require a relatively expensive data communication and system control mechanism. In contrast, the relatively narrower print head of the disclosed printing system may require relatively less formatting memory in the print head computer mechanism and consequently may utilize a less expensive system control mechanism.

The thermal graphic printing systems and methods disclosed herein can be used in many applications. For example, bar-code labels for packages, bottles, metal canisters and the like, sometimes require that item-specific labels have varying widths. Highway signs generally use screen printing production methods and systems, which can be time consuming, inconvenient, and may use quantities of organic solvents. The thermal printing system of this invention allows highway signs having varying widths to be made more conveniently, in less time and with smaller amounts of solvent than known systems. Small production runs such as "made-to-order" retail business signs also can be manufactured with the system described herein. Signage articles made by the method and systems disclosed herein may have lower production costs and can be made more conveniently than hand lettered signs or signs pieced together from smaller width printed subsections, die cut-out characters, electronically cut-out characters, or screening printing.

What is claimed is:

1. A method of thermally transferring colorant from a moving ribbon on to printable areas of a thermal print receptive sheeting, comprising the steps of:

a) moving a thermal print receptive sheeting past a thermal print head, where the thermal print head is elongate and has a length L of at least one centimeter that extends substantially in a first direction; and b) transferring the colorant from the moving ribbon to the thermal print receptive sheeting while moving the thermal print head in a second direction substantially normal to the first direction wherein the sheeting moves in the first direction past the thermal print head and wherein the sheeting movement is halted while transferring the colorant from the ribbon to the thermal print receptive sheeting.

2. The method of claim 1, wherein the thermal print receptive sheeting has a width of at least 16 centimeters.

3. The method of claim 2, wherein the thermal print receptive sheeting has a width of at least 38 centimeters.

4. The method of claim 3, wherein the thermal print receptive sheeting has a width of at least 50 centimeters.

5. The method of claim 1, wherein the thermal print receptive sheeting has a width of at least 46 centimeters.

6. The method of claim 1, wherein the colorant includes a binder that contains a pigment, a dye, or a combination thereof.

7. The method of claim 1, wherein the thermal print head transfers colorant from the movable ribbon to the thermal print receptive sheeting by the simultaneous application of heat and pressure.

8. The method of claim 1, wherein the length L is 4 to 27 centimeters.

9. The method of claim 8, wherein the length L is about 10 or about 16 centimeters.

10. The method of claim 1, further comprising sensing the position of the thermal print relative to the sheeting.

11. The method of claim 1, wherein when the print head is disengaged from the sheeting, the ribbon advance simultaneously ceases.

12. [The method of claim 1, further comprising the step of] *A method of thermally transferring colorant from a moving ribbon on to printable areas of a thermal print receptive sheeting, comprising the steps of:*

*a) moving a thermal print receptive sheeting past a thermal print head, where the thermal print head is elongate and a length L of at least one centimeter that extends substantially in a first direction;*

*b) transferring the colorant from the moving ribbon to the thermal print receptive sheeting while moving the thermal print head in a second direction substantially normal to the first direction wherein the sheeting moves in the first direction past the thermal print head and wherein the sheeting movement is halted while transferring the colorant from the ribbon to the thermal print receptive sheeting; and* c) applying a polymeric film layer to the thermal print receptive sheeting after colorant transfer.

13. The method of claim 1, wherein the thermal print receptive sheeting is a retroreflective sheeting.

14. The method of claim 13, wherein the ribbon comprises a resin-based binder.

15. The method of claim 13, wherein the thermal print receptive sheeting is a cube corner retroreflective sheeting or a beaded lens retroreflective sheeting.

16. The method of claim 1, wherein the thermal print head comprises heatable resistive elements for supplying localized heat that causes the transfer of colorant from the ribbon to the sheeting.

17. The method of claim 1, further comprising the step of disengaging the thermal print head when the thermal print head is moved in the second direction with no colorant [is] being transferred to a printable area of the sheeting, the ribbon ceasing to advance during periods of no colorant transfer.

18. The method of claim 1, wherein the thermal print head is a graphics-based thermal print head.

19. A method of transferring colorant from a moving ribbon on to a printable area of a thermal print receptive sheeting, the method comprising the steps of:

(a) moving a thermal print receptive sheeting in a first direction past a thermal print head that is elongate, that has a length L of at least one centimeter, and that extends in the first direction;

(b) halting movement of the sheeting; and then (c) moving the thermal print head in a second direction normal to the first direction; and (d) transferring colorant from the moving ribbon to the thermal print receptive sheeting.

*20. A method of thermally transferring colorant from a moving ribbon onto printable areas of a thermal print receptive sheeting, comprising the steps of:*

*a) moving a thermal print receptive sheeting in a first direction past a thermal print head, wherein the thermal print head is elongate and has a length L of at least one centimeter that extends substantially in the first direction; and*

*b) transferring colorant from the moving ribbon to the thermal print receptive sheeting while halting the sheeting movement and moving the thermal print head in a second direction substantially normal to the first direction.*

*21. A method according to claim 20, wherein the print head comprises a graphics-based print head with a resolution of at least about 75 dots per lineal centimeter.*

*22. A method according to claim 21, wherein during the transferring step the print head maintains pressure against a platen in the form of a platform.*

*23. A method according to claim 21, wherein the colorant forms graphics-based indicia on the sheeting.*

*24. A method according to claim 20, further comprising sensing the position of the print head relative to the sheeting.*

*25. A method of thermally transferring colorant from a moving ribbon onto printable areas of a thermal print receptive sheeting, comprising the steps of:*

*a) moving a thermal print receptive sheeting in a first direction past a thermal print head, wherein the thermal print head is elongate and has a length L of at least one centimeter that extends substantially in the first direction; and*

*b) transferring colorant from the moving ribbon to the thermal print receptive sheeting while halting the sheeting movement and moving the thermal print head in a second direction substantially normal to the first direction, wherein movement of the ribbon ceases when the print head encounters an area of sufficient size on the sheeting that is not destined to have colorant transferred to it and wherein the print head continues to move across the sheeting in the second direction to an area that is destined to have colorant transferred to it.*

*26. A method according to claim 20, wherein the sheeting comprises a signage article.*

*27. A method according to claim 20, comprising a cross web graphic printing system.*

*28. A method according to claim 20, wherein a single width of ribbon suffices for printing on varying widths of sheeting.*

*29. A method according to claim 20, wherein ribbon is used in proportion to the width of sheeting being printed.*

*30. A method according to claim 20, wherein more than one print operation cycle is employed to complete formation of indicia on the sheeting.*

*31. A method according to claim 20, wherein indicia of more than one color are applied to the sheeting using a single print head.*

*32. A method according to claim 31, wherein after the transfer of a first colorant from a first moving ribbon to the sheeting, a differently colored ribbon is substituted for the first moving ribbon and colorant is transferred from the differently colored ribbon to the sheeting.*

*33. A method of thermally transferring colorant from a moving ribbon onto printable areas of a thermal print receptive sheeting, comprising one or more print operation cycles comprising the steps of:*

*a) moving the sheeting in a first direction past a thermal print head having a row of heating elements with a resolution of at least about 75 dots per lineal centimeter and a length L of at least about one centimeter that extends substantially in the first direction; and*

*b) ceasing movement of the sheeting in the first direction, moving the print head against a platen in the form of a platform in a second direction substantially normal to the first direction, and transferring colorant from the moving ribbon to the sheeting;*

*thereby forming graphics-based indicia on the sheeting.*

*34. A method according to claim 33, wherein indicia of more than one color are applied to the sheeting using a single print head and more than one print operation cycle.*

*35. A method according to claim 34, wherein after the transfer of a first colorant from a first moving ribbon to the sheeting, a differently colored ribbon is substituted for the first moving ribbon and colorant is transferred from the differently colored ribbon to the sheeting.*

*36. A method of thermally transferring colorant from a moving ribbon onto printable areas of a thermal print receptive sheeting, comprising the steps of:*

*a) moving the sheeting past a thermal print head having a row of heating elements with a resolution of at least about 75 dots per lineal centimeter and a length L of at least one centimeter that extends substantially in the direction of movement of the sheeting; and*

*b) moving the print head across the sheeting in a direction substantially normal to such direction of movement of the sheeting and transferring colorant from the moving ribbon to the sheeting while movement of the sheeting ceases.*

*37. A method according to claim 36, wherein when transferring colorant the print head maintains pressure against a platen in the form of a platform.*

*38. A method according to claim 36, wherein indicia of more than one color are applied to the sheeting using a single print head.*

*39. A method according to claim 36, wherein after the transfer of a first colorant from a first moving ribbon to the sheeting, a differently colored ribbon is substituted for the first moving ribbon and colorant is transferred from the differently colored ribbon to the sheeting.*

*40. A method of thermally transferring colorant from a moving ribbon onto printable areas of a thermal print receptive sheeting, comprising the steps of:*

*a) moving the sheeting past a thermal print head having a row of heating elements with a resolution of at least about 75 dots per lineal centimeter and a length L of at least one centimeter that extends substantially in the direction of movement of the sheeting; and*

*b) moving the print head across the sheeting in a direction substantially normal to such direction of movement of the sheeting and transferring colorant from the moving ribbon to the sheeting while movement of the sheeting ceases, wherein movement of the ribbon ceases when the print head encounters an area of sufficient size on the sheeting that is not destined to have colorant transferred to it and wherein the print head continues to move across the sheeting to an area that is destined to have colorant transferred to it.*

*41. A method according to claim 36, wherein the print head has a row of heating elements with a length L of about 10 centimeters.*

* * * * *